United States Patent Office 3,216,754
Patented Nov. 9, 1965

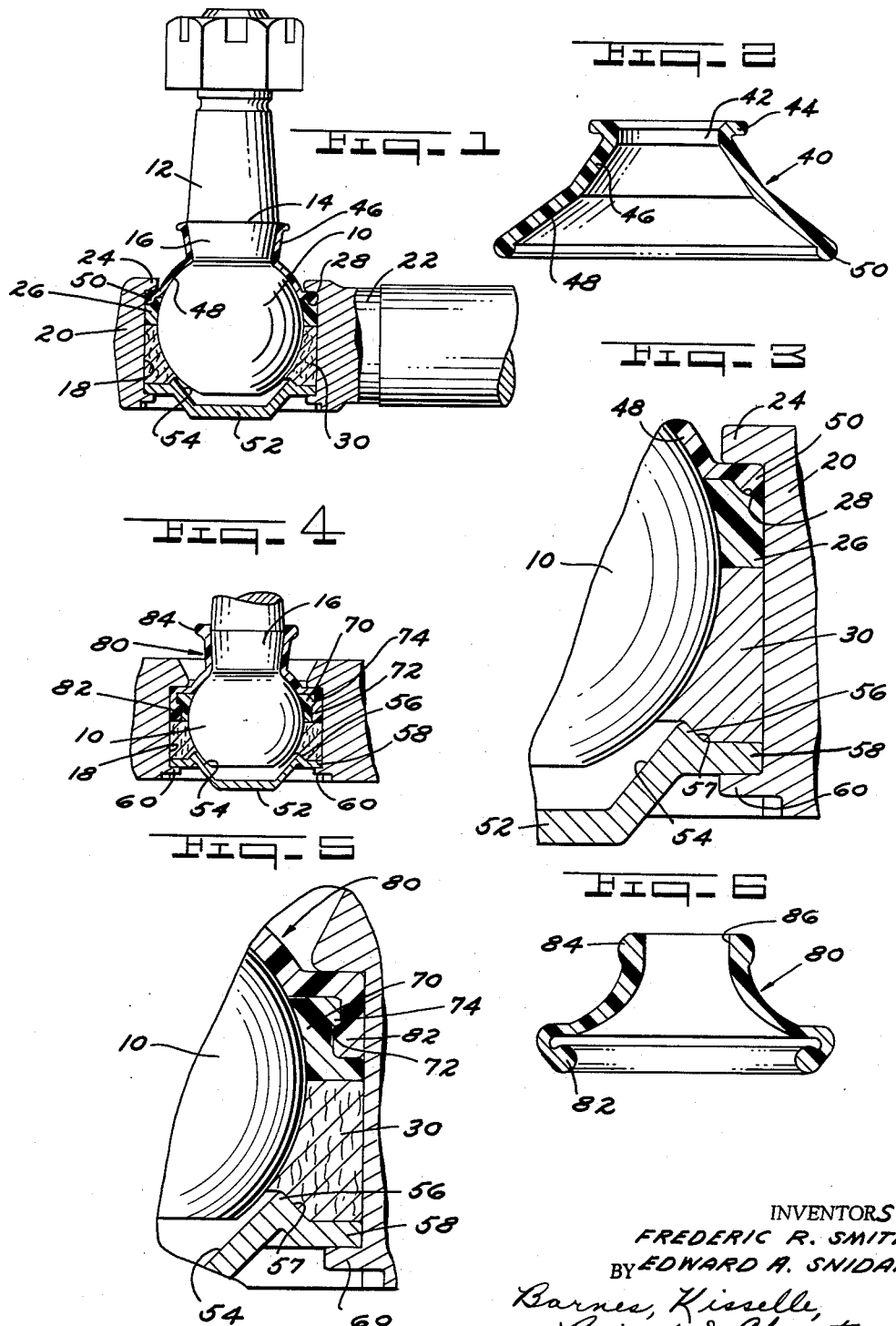

3,216,754
BALL JOINT
Frederic R. Smith and Edward A. Snidar, Whitmore Lake, Mich., assignors to O. & S. Bearing & Mfg. Co., Whitmore Lake, Mich., a corporation of Michigan
Filed Mar. 26, 1962, Ser. No. 182,474
4 Claims. (Cl. 287—87)

This invention relates to a ball joint and particularly that type of joint which is used in vehicles in the steering mechanism or other suspension systems.

It has been a problem through the years to provide a ball joint which would maintain its frictional characteristics throughout a long period of use. In present day automotive construction, it is even more important that these bearings be constructed in such a way that they require no lubrication. To accomplish this, of course, it is important that the destructive elements be sealed out of the joint. These elements include water and dust and sand which inevitably accumulates on the chassis of a vehicle.

There are a number of patents of record wherein the sealing problem in connection with the bearing construction has received the attention of the inventors. Reference is made to Flumerfelt 2,288,160, dated June 30, 1942, and to Abramoska 2,496,830, dated February 7, 1950, Booth 2,593,253, dated April 15, 1952, and Kogstrom 2,921,809, dated January 19, 1960. In each of these patents a sealing sleeve has been mounted around the exposed portion of the stud and the skirt of the sleeve is anchored on or to the outside of the ball housing. These seals have performed satisfactorily for limited use but on the breakdown tests that are used for vehicles today, these seals have created some problems. They have resulted in limited angular clearance, and the need for greater clearance has increased as the years have gone on in vehicle construction. In addition, despite the fact that efforts have been made to provide a rotating joint between the skirt and the ball stud, this has through usage and exposure broken down to the point that the skirt would not rotate relative to the ball stud, and this would cause what is called "wind-up" where the skirt became twisted with the turning operation and very rapidly broke down after this condition developed.

It is an object of the present invention to provide a new bearing construction and seal, the two being interrelated to the extent that the ball and socket joint can have a total included angularity of about 55° without causing what is called gapping and exposing the internal surfaces of the joint elements.

It is also an object to provide a construction wherein the relative rotation between the ball and the socket will not cause a wind-up action which stretches and breaks the seal.

Another object is the provision of a composite joint wherein the edges of the skirt of the seal are locked circumferentially to prevent separation and wherein the actual bearing pressure of the assembly is obtained by the inclusion of a portion of a sealing member.

Other objects and features of the invention relating to details of construction and operation will be apparent in the following description and claims.

Drawings accompany the disclosure and the various views thereof may be briefly described as:

FIGURE 1, a sectional view showing the relationship of the assembled parts.

FIGURE 2, a sectional view of the seal prior to assembly.

FIGURE 3, an enlarged section showing the relationship of the various parts of FIGURE 1 in assembly.

FIGURE 4, a slightly modified assembly shown in cross section.

FIGURE 5, a modification in section showing a top ring similar to that of FIGURE 4 but with side wall contact.

FIGURE 6, a sectional view of the sealing device of FIGURE 4.

Referring to the drawings:

A ball stud illustrated as a ball end 10 with a shank 12 tapering from the free end to a maximum diameter at 14 and reducing in diameter in the short portion 16 to the point of merger with the ball. The ball is mounted in a recess 18 in a ring 20 having a radial extension arm 22. At the top of the recess 18 is an inwardly extending annular flange 24. The bearing is formed essentially of two bearing elements, first, a high polymer ring 26 formed of a material such as nylon or Delrin or other similar thermosetting resins which have proved satisfactory as a load-carrying, self-lubricating bearing material.

This ring 26 has a spherical inner surface designed to position just above the equatorial portion of the ball 10, the outer surface of the ring being cylindrical in form to interfit with the walls of the recess 18. The bottom surface of the ring is flat and the top surface has an annular recessed portion 28 on the outer corner to serve a function to be later described in connection with the sealing member.

Below the ring 26 and the equatorial portion of the ball is a ring of lubricant impregnated compressed material such as a fabric or fibrous material 30 which again has an inherent resilience capable of recovery after compression and formed with a spherical inner surface to complement the ball 10 and a cylindrical outer surface to interfit with the walls of the recess 18. The material used to impregnate the fibrous member 30 is preferably a compound composed of mineral oil, stearic acid and calcium stearate, such as that described in the Delp Patent 2,379,478, issued July 3, 1945, or an equivalent of this material.

The sealing skirt 40 previously referred to is illustrated in FIGURE 2. It has a neck portion 42 with an outwardly extending flange 44 and tapers outwardly in a first section 46 which merges with another section 48, having a larger flare angle. The bottom edge or lip 50 of the skirt is formed as an enlarged bead having a diameter greater than the wall thickness of the skirt. The inner diameter of the neck portion 42 is also preferably designed smaller than the portion 14 of the ball shank which it is intended to embrace. When the parts are in assembly as shown in FIGURES 1 and 3, the bead 50 is compressed into the corner of the recess 18 just below the flange 24 and just above the recess 28 at the upper corner of the ring 26. The enlarged bead 50 and the contiguous portion of the skirt are locked into the recess provided in this area between two parts, and then the remaining skirt portion 48 overlies the top portion of the ball and the skirt portion 46 surrounds the lower portion 16 of the shank. The entire assembly within the recess 18 is compressed into position during the assembly and retained by a shaped disc which has a flat bottom 52 below a conical recess 54.

The disc has an internal annular ridge 56 at the point of merger of the walls of the recess 54 with a retaining surface 57 and an outwardly extending flange 58. The annular surface 57 is preferably perpendicular to the tangents of the surface of the ball and it lies as close as possible to the ball to keep the material 30 from dragging out. The clearance usually sought in a normal-size ball is .010–.015″, but it must be such that under severe shock loads, the ball will not strike the disc. The disc also exerts pressure on the material 30 and cooperates in the loading of the joint to the frictional characteristic desired. This internal load positions and helps retain the seal. The disc is held in place by portions 60 of the housing which are staked, flanged, or spun into a position contacting the outer periphery of the flange 58. The dropped central portion 52 of the disc provides clearance for the bottom end of the ball and the spacing of this bottom from the center of the ball will depend on the amount of angularity for which the joint is designed.

The material from which the parts 40 are constructed is important to the success of the device. It is preferably a polyurethane material having a low coefficient of friction and a low durometer characteristic of approximately 45 to 50. The durometer reading, which is usually used for rubber, is not exactly accurate in connection with this particular material; but until another measuring instrument is available, this is the most accurate that can be used. The material has a high recovery rate and a high resistance to permanent set. Because of the low co-efficient of friction, it has a fairly oily feel to the touch. A successful material has been a compound sold under the tradename "Vulkollan" supplied by a German company, Lemforder Metallwarengesellscaft under the number 2018 WPK or LE-58. U.S. Patents 2,620,516 and 2,729,618 disclosing an improved diisocyanate-modified-polyester are referred to for disclosures of materials to be used.

This material has a toughness which prevents breaks and cracks and it also has a sufficiently slippery surface that the shank of the ball will not seize or vulcanize relative to the material to cause the objectionable wind-up previously referred to. The bead 50 locked to the recess defined by the ring 26 and the flange 24 prevents pull-out of the skirt, also acts as a seal preventing entry of foreign matter at this point, and the tight fit around the ball shank prevents gapping as well as permits the rotative motion desirable between the two parts.

In FIGURE 4, a modified construction is shown wherein the parts below the equatorial line of the ball 10 are identical to those previously described. The upper portion of the joint is composed of a ring 70 which has a spherical inner surface with a cylindrical outer surface 72 of smaller diameter than the recess 18 and an annular bead portion 74 which projects outwardly from the surface 72. The sealing element 80 shown in repose in FIGURE 6 has a depending bead portion 82 at the bottom and a bead portion 84 at the top around the neck opening 86. As shown in assembly, the bead portion 82 locks into the annular re-entrant recess created by the bead 74 and the walls of the recess 18 and the remainder of the skirt fits snugly over the top of the ball 10 and the shank portion 16. The cross-sectional dimension of the beaded portion 82 is greater than the opening of the re-entrant recess. The corner of the recess 18 above the bead 74 also locks the lower skirt portion of the member 80. The assembly, materials, and the operation of the device are otherwise the same as that described in connection with FIGURE 1.

It will be noted that the skirt in FIGURE 4 comes lower into the joint than the skirt in FIGURE 1. In many cases a single skirt can be adapted to joints of a different size by carrying the bead further down into the joint. One extreme is shown in FIGURE 1 and the other extreme is shown in FIGURE 4. It is preferable that some portion of the ring 26 or 70 bear against the side walls of the socket as shown in FIGURE 1 and in the modified ring of FIGURE 5 since this gives a resistance to side thrust where the radial flange below bead 82 contacts the wall of recess 18 and removes from the sealing member the crushing force of the bearing loads.

It has also been found that the seal works best on a joint wherein the shank of the ball has an enlarged portion which tapers down to the ball itself rather than a straight shank.

We claim:
1. A ball and socket joint particularly for the steering gear of a motor vehicle comprising:
   (a) a socket having a cylindrical wall terminating in an annular internal flange having an internal diameter less than that of said wall,
   (b) a ball head in said socket having a shank extending through the opening formed by said flange,
   (c) bearing elements comprising:
   (d) a plastic ring of bearing material between the equatorial portion of said ball and said flange having a portion in contact with the wall of said socket and adjacent said portion an outer annular recess,
   (e) a second bearing eleemnt of lubricant impregnated fibrous material surrounding said ball between the equatorial portion thereof and the free end within said socket and having inner and outer surfaces complemental respectively to said ball and said socket,
   (f) means at the free end of said ball within said socket for holding said parts in assembly and under axial pressure and sealing the one end of said socket opposite said flange, and
   (g) means at the shank end of said ball for surrounding said shank and sealing the flanged end of said socket comprising:
   (h) a flaring skirted member having a narrow neck portion dimensioned to stretch over and rotate relative to said shank and a beaded portion at the other and wide end of the skirt to be received by and locked in said annular recess between said plastic ring and the wall of said socket, said plastic bearing ring having:
      (1) a spherical inner surface complemental to said ball, and
      (2) a cylindrical outer surface lying in spaced relation to the wall of said socket the annular recess being positioned on the outer surface of said ring adjacent the end away from said flange to form, with the walls of said socket, an annular re-entrant recess, said re-entrant recess having an annular opening narrower than the cross-sectional diamension of said beaded portion.

2. A ball and socket joint particularly for the steering gear of a motor vehicle comprising:
   (a) a socket having a cylindrical wall terminating at one end in an annular internal flange having an internal diameter less than that of said wall and extending radially inwardly therefrom substantially at right angles thereto,
   (b) a ball head in said socket having a shank extending through the opening formed by said flange,
   (c) bearing elements between said cylindrical wall and ball head comprising:
   (d) a plastic ring of bearing material between the equatorial portion of said ball and said flange and having inner and outer peripheral walls and also having spaced end portions with said outer peripheral wall having an annular recess spaced from the end of said plastic ring adjacent said annular internal flange,
   (e) a second bearing ring element of lubricant impregnated fibrous material surrounding said ball between the equatorial portion thereof and the free end within said socket and having inner and outer peripheral surfaces complemental respectively to said ball and said socket wall,
   (f) means at the free end of said ball within said socket for holding said parts in assembly and under axial pressure and sealing the one end of said socket opposite said flange, and
   (g) sealing means at the shank end of said ball for surrounding said shank and sealing the flanged end of said socket comprising:
   (h) an annular flaring skirted member having a narrow neck portion engaging and surrounding said shank and an enlarged beaded portion at the other and flared end of the skirt, said flared end of the skirt extending radially outwardly between said internal flange and the end of said plastic ring adjacent thereto and then axially toward the other end of the housing between said cylindrical wall and the outer peripheral wall of said plastic ring and finally with said enlarged beaded portion extending radially inward into said annular recess.

3. A ball and socket joint of the type used in a steering mechanism utilizing a ball and stud, a substantially cylindrical housing body for receiving said ball, and interposed annular bearing inserts confined under axial pressure between said ball and said body, that improvement in construction which comprises:

(a) an annular bearing insert at the stud side of said ball having spaced end portions and an inner peripheral surface complemental to and engaging said ball and a segment of its outer peripheral surface at one end contacting and interfitted with said body and with the remaining portion of said outer peripheral surface being spaced from said body, there being formed in the outer peripheral surface of said insert an annular groove between said portion of the outer peripheral surface contacting said body and the other end of said insert and so forming, with the walls of said body, an annular reentrant recess opening toward said stud, (b) an annular flaring skirted sealing member having a narrow neck portion surrounding and in sealing engagement with said stud and an annular enlarged beaded portion at the other and flared end of said member received by said opening and locked in said groove between said insert and said body,
whereby radial forces between said ball and body are received by said insert to relieve crushing forces on said skirted member, and (c) said body having a radially inwardly extending annular flanged portion at the stud side of said ball overlying a portion of said insert, said skirted member being confined annularly under pressure between said flanged portion and one end of said bearing insert.

4. A ball and socket joint of the type used in a steering mechanism utilizing a ball and stud, a substantially cylindrical housing body for receiving said ball, and interposed annular bearing inserts confined under axial pressure between said ball and said body, that improvement in construction which comprises:

(a) an annular bearing insert at the stud side of said ball having spaced end portions and an inner peripheral surface complemental to and engaging said ball and a segment of the outer peripheral surface at one end contacting and interfitted with said body and with the remaining portion of said outer peripheral surface being spaced from said body, there being formed in the outer peripheral surface of said insert an annular groove between said portion of the outer peripheral surface contacting said body and the other end of said insert and so forming, with the walls of said body, an annular re-entrant recess opening toward said stud, (b) an annular flaring skirted sealing member having a narrow neck portion surrounding and in sealing engagement with said stud and an annular enlarged beaded portion at the other and flared end of said member received by said opening and locked in said groove between said insert and said body, and (c) radially extending means at each end of said body to confine said inserts under axial pressure and retain said ball in said body,
whereby radial forces between said ball and body are received by said insert to relieve crushing forces on said skirted member.

References Cited by the Examiner

UNITED STATES PATENTS 2,280,634 4/42 Flumerfelt.
2,976,068 3/61 Jordan.
3,027,182 3/62 Reuter.

FOREIGN PATENTS 840,176 7/60 Great Britain.

CARL W. TOMLIN, *Primary Examiner.*